UNITED STATES PATENT OFFICE.

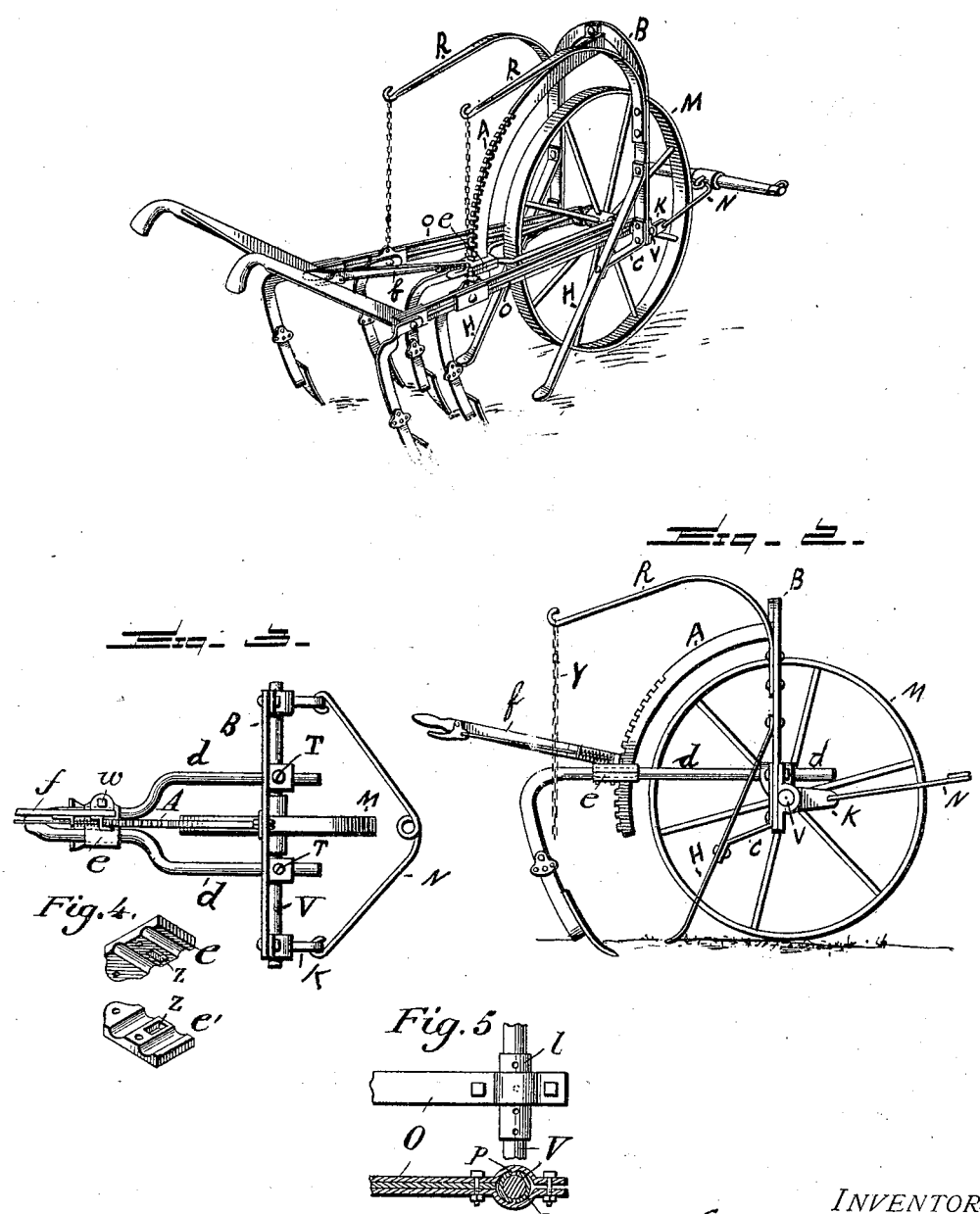

EVERETT S. SLOUGH, OF QUINCY, KANSAS.

WHEEL-CULTIVATOR.

SPECIFICATION forming part of Letters Patent No. 683,151, dated September 24, 1901.

Application filed March 9, 1901. Serial No. 50,507. (No model.)

*To all whom it may concern:*

Be it known that I, EVERETT S. SLOUGH, residing at Quincy, in the county of Greenwood and State of Kansas, have invented a new and useful Improvement in Wheel-Cultivators, of which the following is a specification.

My invention relates to improvements in wheel-cultivators; and it consists in the novel construction and arrangement of its parts.

The objects of my improvement are to provide a machine which can be drawn between the plant-rows, cultivating the middle instead of either side of row, to cultivate plants which are too tall for a machine to pass over them, and for the purpose of stirring the soil preparatory to reseeding between rows of plants which have not yet been harvested.

Figure 1 is a perspective view of the entire cultivator. Fig. 2 is a side elevation of a cultivator embodying the invention. Fig. 3 is a top view showing in combination the arch, spindle, wheel, rigid beam, clevis-bars, clevis-arch, and adjusting-lever. Fig. 4 is a detail view of the clamping-plates for the adjusting-lever. Fig. 5 shows the connection of the side bars with the spindle in plan and in section.

Similar letters refer to similar parts throughout the several views.

The arch B, the downward and backwardly extending legs H, the spindle V, with the segment-rack A and brace C, and clevis-bar K constitute the frame of the machine. The supporting-wheel M is journaled at the center of spindle V. About midway down the two sides of arch B are fastened on either side steel springs, curving upwardly and extending back from arch B. These springs have a hook or eye in the outward end, from which is dropped a chain to the two outside beams O. The segment-rack A, fastened at the top to arch B, curves back and down over the wheel, passing between the pipes *d*, which pipes form the center beam. A lever *f* is fastened to a lug on the clamping-plate *e*, and the clamping-plates *e e'* are adjustable by means of a nut and a bolt passing through them near the central part and holding them rigid on the pipes of the center beam. A small bolt secured by a nut is passed through the other small hole in the clamping-plates *e e'* outside of one of the pipes *d* for the purpose of strengthening clamping-plates when the nut on the center bolt is tightened. The clamping-plates *e e'* have slots Z Z for receiving the segment-rack, which has stop-notches. The beam *d d* thus may be raised or lowered to let center cultivating-blade in or out of the soil. The pipes *d d* are secured to the spindle by means of clamps or set-screws T. By the combination of the adjustable clamping-plates *e e'* and the clamps or set-screws T the pipes *d d* may be adjusted so as to bring the center cultivating-blade nearer to the spindle *v*, thus throwing the cultivating-blade in or out of line with the other cultivating-blades on either side, as may be desired. On either side of the supporting-wheel M and outside of pipes *d* on the spindle *v* are mounted pipe-couplings *l* to sustain the side bars *o o*. The side bars *o* are connected with the pipe-coupling by means of lugs, one lug being on the upper one of the bars and one on the lower one of the bars which form the beam O. The lugs fit in depressions in the pipe-coupling. The two bars forming the beam O are bent in the form of an arc around the coupling, one working below and the other above. They are held together by means of bolts and nuts, one of which passes through the ends of the bars a little forward of the pipe-coupling. The other bolt is passed through the pipes just back of the pipe-coupling. Thus the lugs are held in the depression in the coupling-pipes and sustain the weight of the beams. The pipe-coupling *l* allows either beam to be raised or lowered independently of the other. The lugs form a pivot in the pipe-coupling *l*, allowing the side bars *o* to have a lateral movement which can be regulated by means of handles. The center beam, composed of pipes *d d*, being rigidly secured will have a tendency to cause the supporting-wheel M and center cultivating-blade to follow directly in line of the draft when this cultivating-blade is at work; but when it is raised by means of the lever *f* the lateral movement of the outside beams O will allow the wheel to follow the horse in turning around at ends. The two sustaining-legs H are intended to carry a little above the surface of the ground when the cultivator is at work and to be turned up a little at the bottom. They may be regulated somewhat by means of the chain sections Y in conjunction with raising or lowering the rear of center beam upon the segment-rack A. Thus the position of the arch B may be changed with reference to the weight of beams and the draft on the clevis-bars K, thus raising or lowering the legs. These legs H are intended to help sustain the plow when it is at rest or the pipes $d$ are hung on segment-rack A.

What I claim as my invention, and desire to secure by Letters Patent, is—

1. The combination in a wheel-cultivator of an arch for a frame having rigidly fastened to it two backwardly and downwardly extending legs, which legs are braced from the lower ends of the arch, said arch-frame being rigidly fastened to the clevis-bars and to the respective ends of the spindle in the center of which spindle a supporting-wheel is journaled, as set forth.

2. The combination in a wheel-cultivator of an arch-frame, a spindle in the center of which is journaled a supporting-wheel, the rigid center beam attached to the spindle by means of pipes on either side, said pipes fitting in clamps adjustable by means of a screw, an adjustable clamping-plate between said pipes at the rear of the center beam, all substantially as set forth.

EVERETT S. SLOUGH.

Witnesses:
J. E. COURTRIGHT.
H. A. CLARK.